United States Patent
Unno

(10) Patent No.: US 8,226,527 B2
(45) Date of Patent: Jul. 24, 2012

(54) STRADDLE TYPE VEHICLE AND SPEED CHANGE CONTROL UNIT OF CONTINUOUSLY VARIABLE TRANSMISSION

(75) Inventor: Toshio Unno, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 1023 days.

(21) Appl. No.: 11/571,485

(22) PCT Filed: Jul. 7, 2005

(86) PCT No.: PCT/JP2005/012608
§ 371 (c)(1),
(2), (4) Date: Jan. 28, 2008

(87) PCT Pub. No.: WO2006/006506
PCT Pub. Date: Jan. 19, 2006

(65) Prior Publication Data
US 2008/0194380 A1  Aug. 14, 2008

(30) Foreign Application Priority Data
Jul. 9, 2004  (JP) .................................. 2004-203851

(51) Int. Cl.
*F16H 61/662* (2006.01)
(52) U.S. Cl. ........................................................ 477/44
(58) Field of Classification Search .................... 477/43, 477/44, 115, 122, 125, 140, 141; 701/55, 701/56; 474/70, 72
See application file for complete search history.

(56) References Cited

U.S. PATENT DOCUMENTS

| | | | |
|---|---|---|---|
| 4,501,171 A * | 2/1985 | Muller et al. ................. | 477/139 |
| 5,924,955 A | 7/1999 | Ishii et al. | |
| 6,012,009 A * | 1/2000 | Kronenberg et al. .......... | 701/56 |
| 6,033,338 A * | 3/2000 | Jackson et al. .................. | 477/44 |
| 6,086,506 A * | 7/2000 | Petersmann et al. ............ | 477/45 |
| 6,411,878 B2 * | 6/2002 | Hanawa et al. ................. | 701/51 |
| 6,511,398 B2 * | 1/2003 | Kitai et al. ...................... | 477/44 |
| 7,225,892 B1 * | 6/2007 | Berthiaume ................. | 180/230 |
| 7,641,016 B2 * | 1/2010 | Unno et al. .................. | 180/230 |
| 2001/0034286 A1 * | 10/2001 | Gagnon et al. .................. | 477/80 |
| 2002/0027031 A1 * | 3/2002 | Miyata .......................... | 180/219 |
| 2004/0097328 A1 * | 5/2004 | Makiyama et al. ............. | 477/43 |

FOREIGN PATENT DOCUMENTS
DE   31 39 838 A1   4/1983
(Continued)

OTHER PUBLICATIONS

English Translation of JP 62273183 A, Dec. 2010, Schreiber Translations Inc.*

*Primary Examiner* — Roger Pang
(74) *Attorney, Agent, or Firm* — Rabin & Berdo, Jr.

(57) ABSTRACT

A straddle type vehicle with a control unit that improves riding comfort and controls the speed change of a continuously variable transmission electronically. Engine output is controlled by an accelerator operating part. The control unit shifts to a kick down mode where a speed change ratio is shifted to be lower than in a normal mode according to operation of a kick down switch separate from the accelerator operating part. A kick down release command is issued according to a state of the vehicle, and kick down mode is released and returned to normal mode.

28 Claims, 9 Drawing Sheets

FOREIGN PATENT DOCUMENTS

| | | |
|---|---|---|
| DE | 197 04 664 A1 | 8/1997 |
| DE | 10065725 A1 | 7/2002 |
| EP | 1 178 243 A2 | 2/2002 |
| EP | 1 318 334 A2 | 6/2003 |
| GB | 2 311 572 A | 10/1997 |
| GB | 2 343 922 A | 4/1999 |
| JP | 60-260754 | 12/1986 |
| JP | 62-125923 | 6/1987 |
| JP | 62-273183 | 11/1987 |
| JP | 64-036530 | 2/1989 |
| JP | 01-153862 | 6/1989 |
| JP | 01-176846 | 7/1989 |
| JP | 02-150562 | 6/1990 |
| JP | 04-131558 A | 5/1992 |
| JP | 09-217799 | 8/1997 |
| JP | 10-002404 | 1/1998 |
| JP | 2005-023991 | 1/2005 |

\* cited by examiner

[FIG. 1]
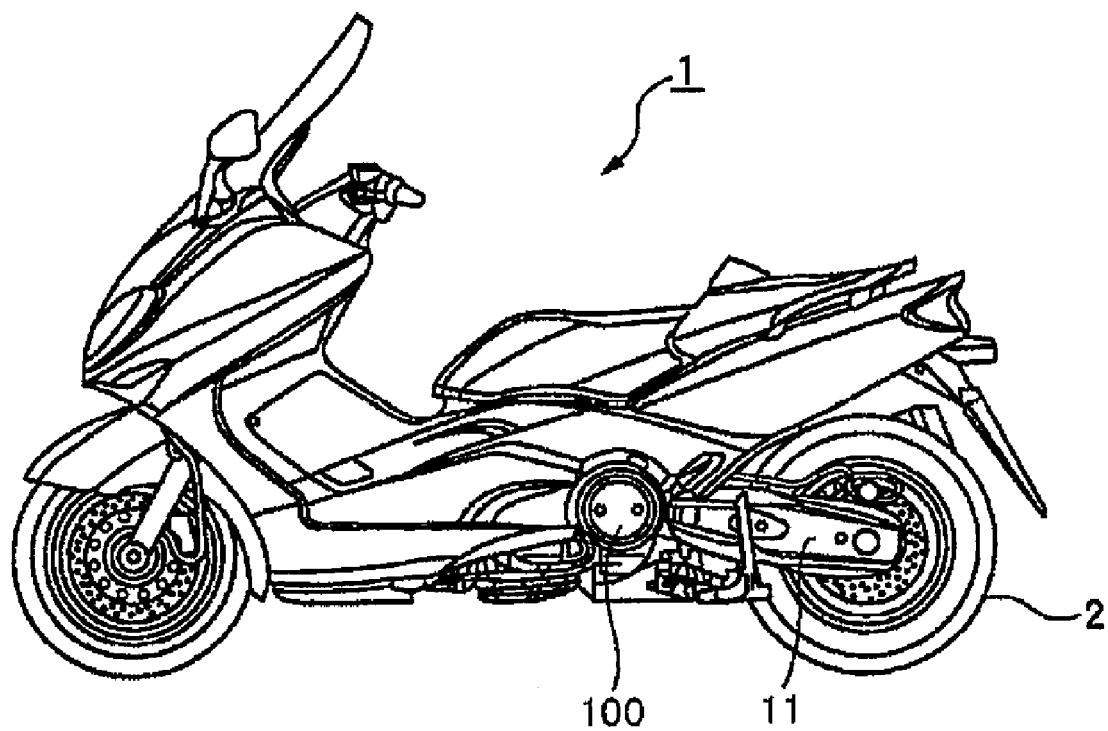

[FIG. 2]
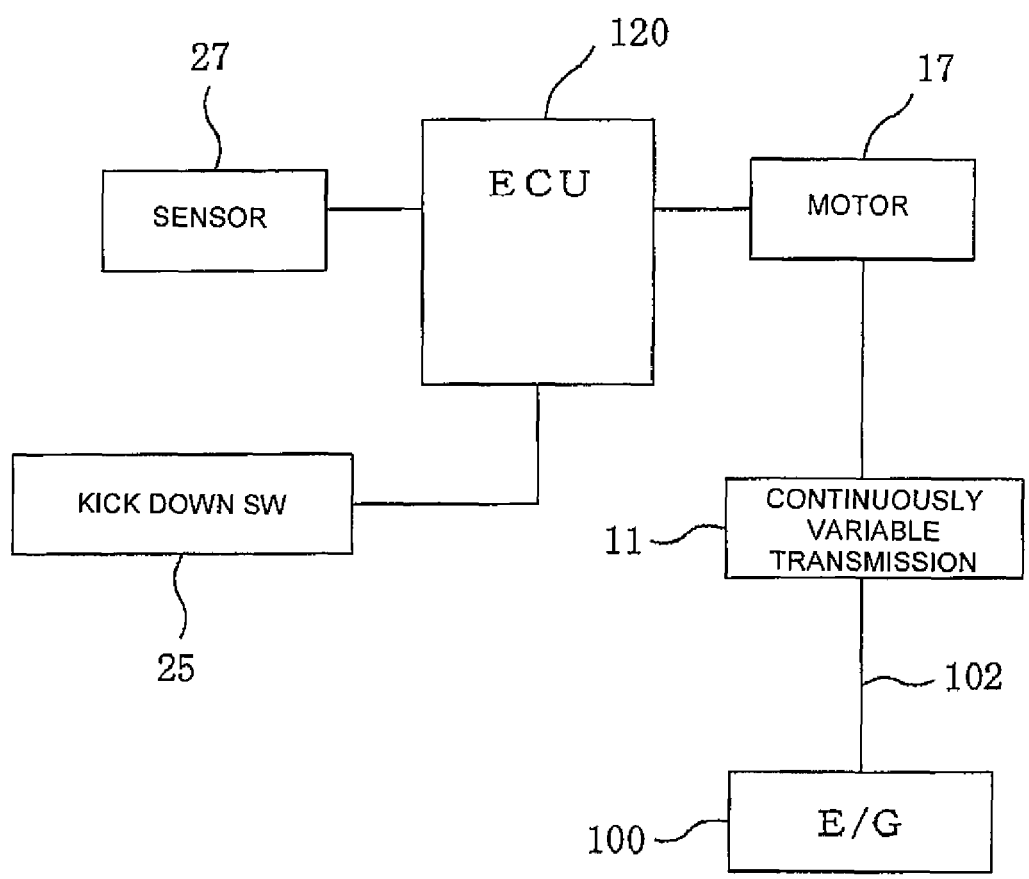

[FIG. 3]
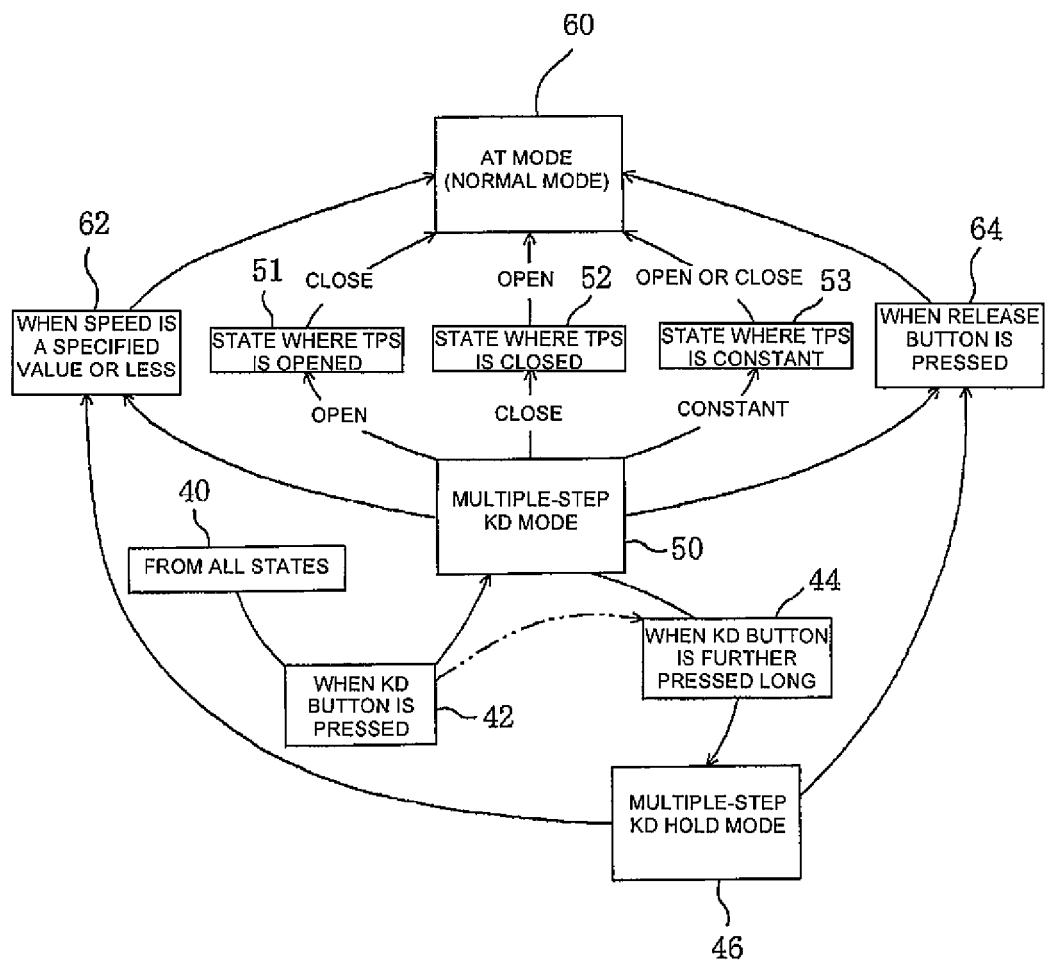

[FIG. 4]
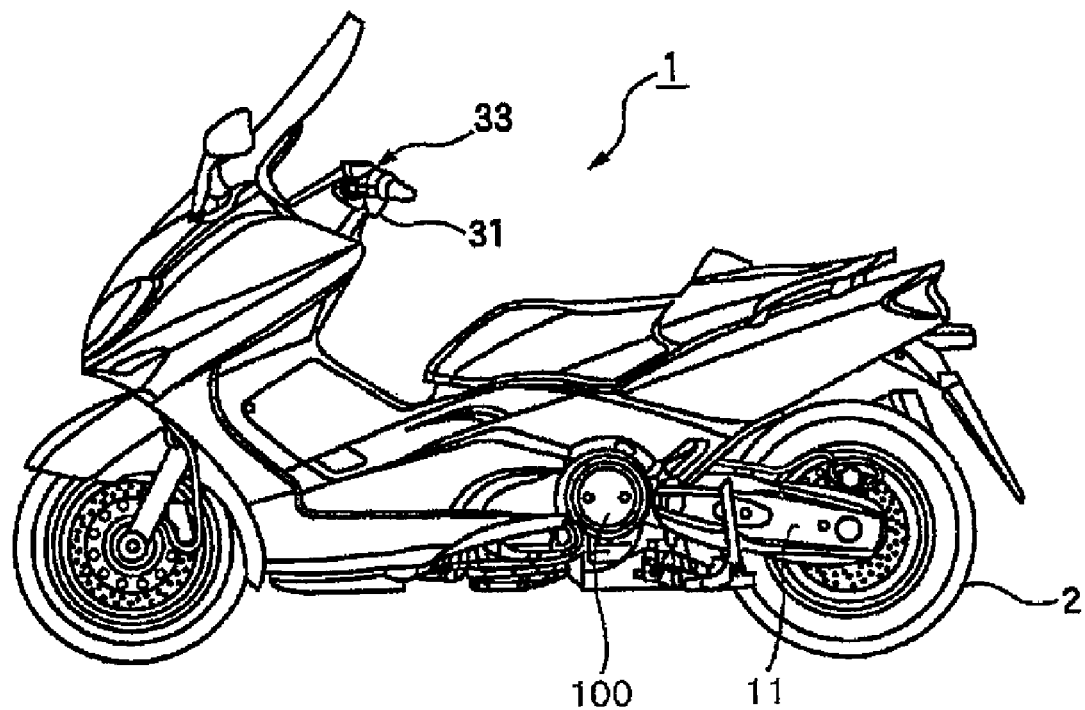

[FIG. 5]
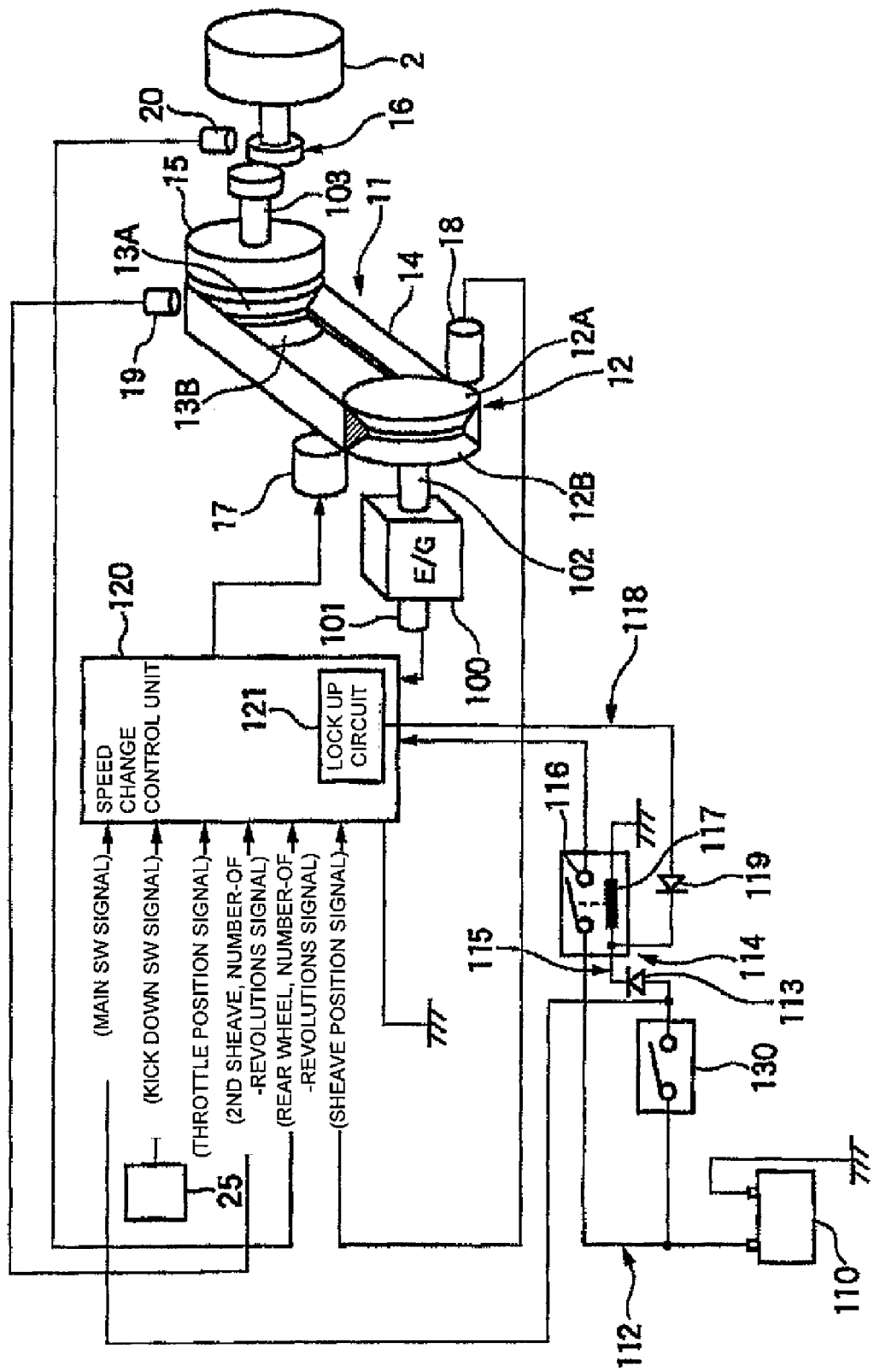

[FIG. 6]
(a)
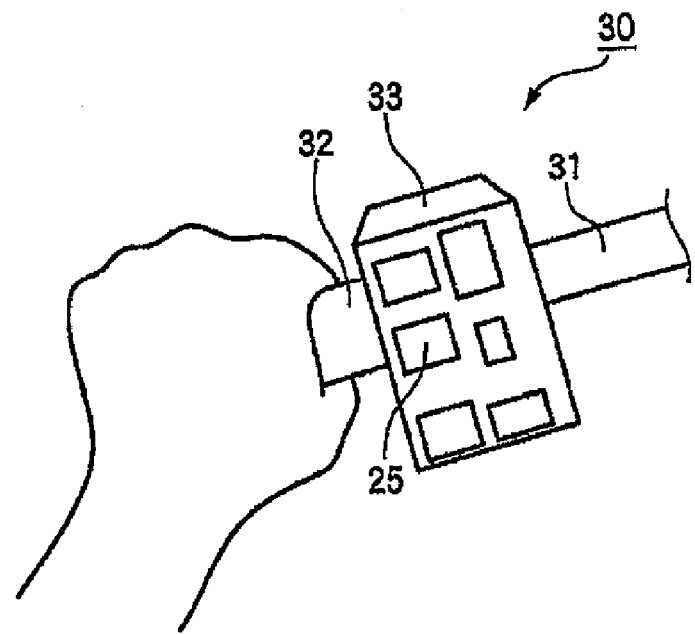
(b)
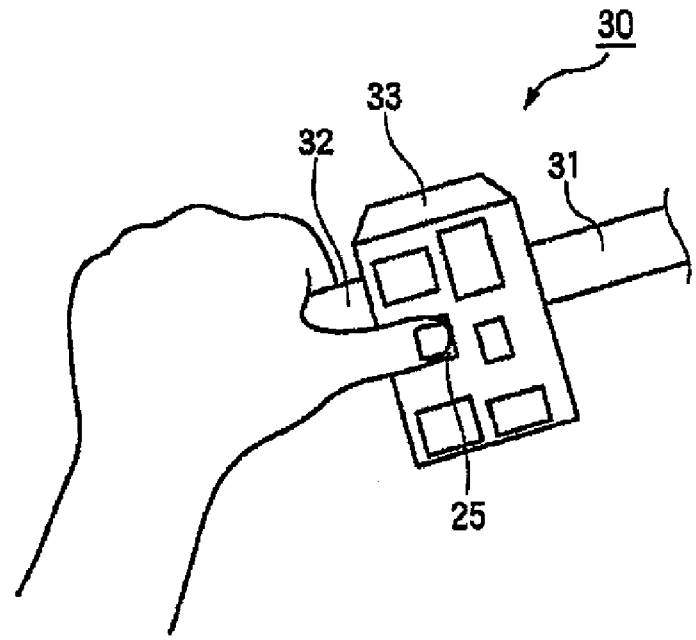

[FIG. 7]
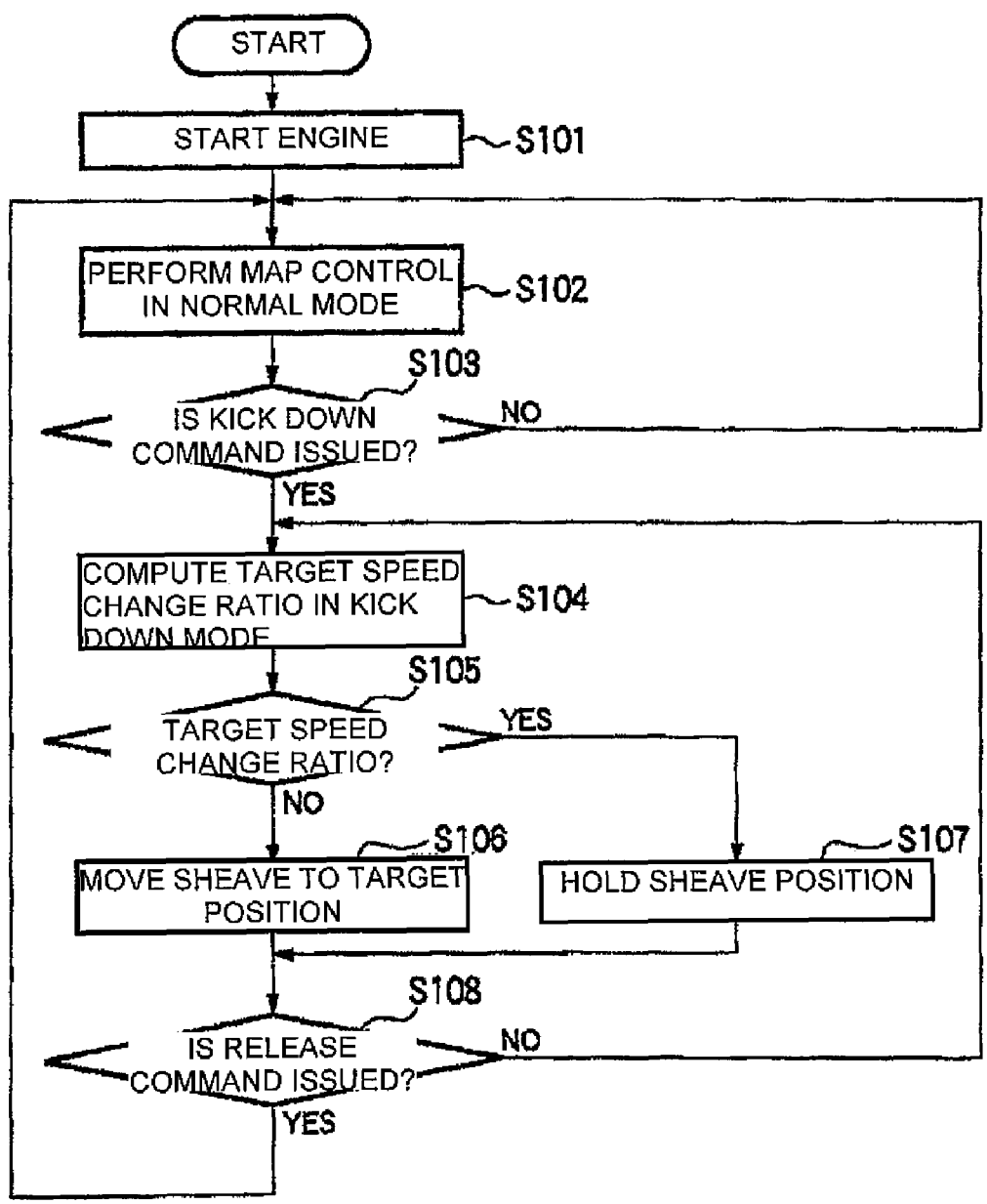

[FIG. 8]
(a) KICK DOWN AT THE TIME OF ACCELERATION
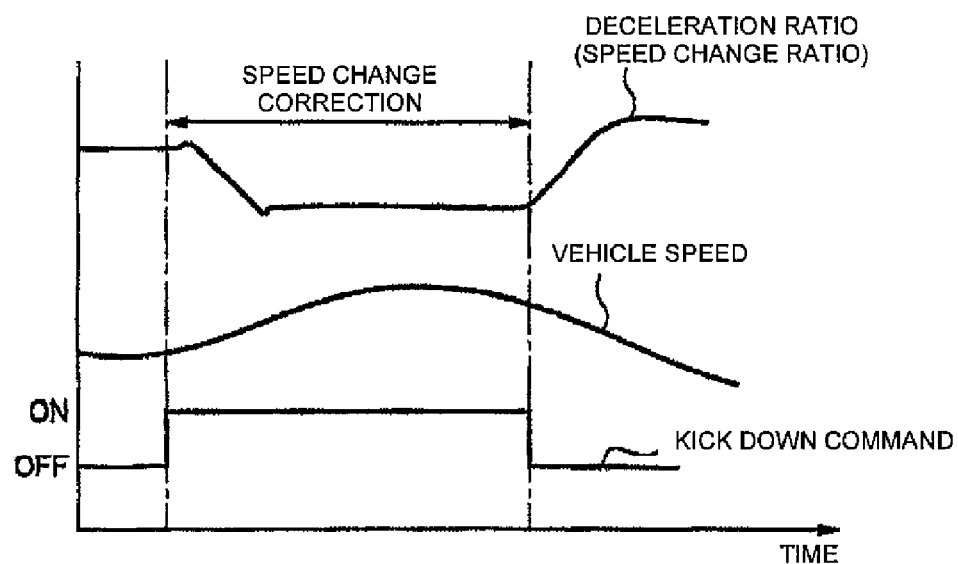
(b) KICK DOWN AT THE TIME OF DECELERATION
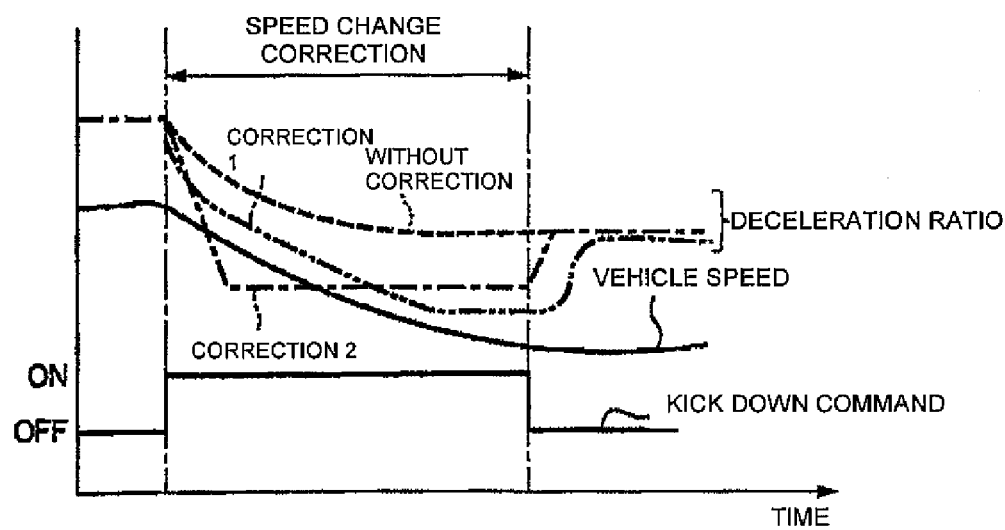

[FIG. 9]
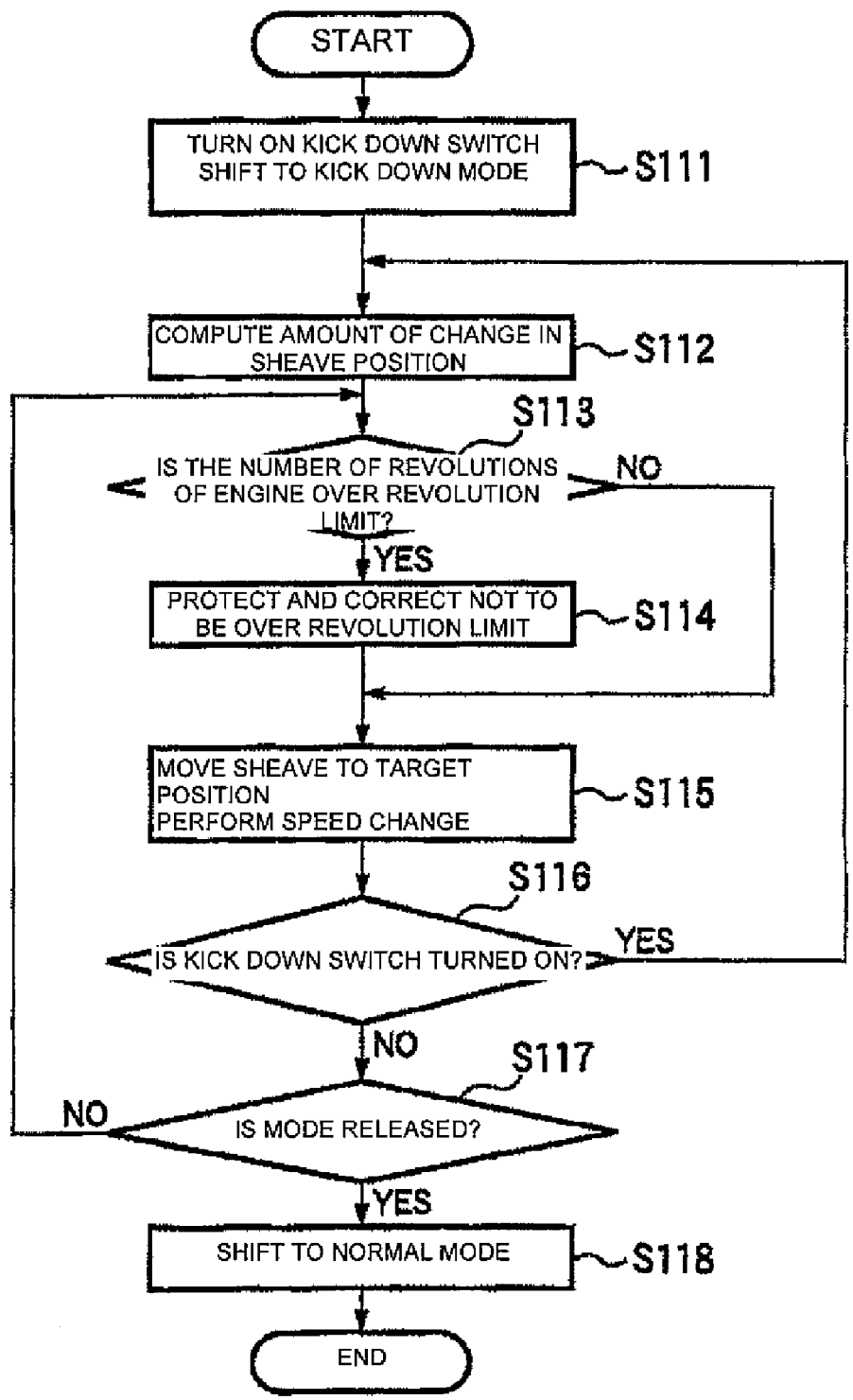

STRADDLE TYPE VEHICLE AND SPEED CHANGE CONTROL UNIT OF CONTINUOUSLY VARIABLE TRANSMISSION

CROSS-REFERENCE TO THE RELATED APPLICATIONS

This application is a national phase of the international application No. PCT/JP2005/012608 filed Jul. 7, 2005, the entire contents of which are incorporated by reference. This application also claims benefit of priority under 35 U.S.C. § 119 to Japanese Application No. 2004-203851 filed Jul. 9, 2004, the entire contents of which are incorporated by reference.

TECHNICAL FIELD

The present invention relates to a speed change control device of a continuously variable transmission mounted in a straddle type vehicle.

BACKGROUND ART

A V-belt type continuously variable transmission is widely used in straddle type vehicles such as scooter type two-wheeled motor vehicles. A V-belt type continuously variable transmission includes a primary sheave arranged on a primary shaft and having the output of a power source such as an engine inputted thereto, and a secondary sheave arranged on a secondary shaft and having an output to a driving wheel taken therefrom. The grooves of the primary and secondary sheaves are varied in width. A V belt is looped around the sheaves. A groove width adjusting mechanism adjusts looping radiuses of the V belt with respect to the sheaves by changing groove widths of the sheaves to thereby adjust a speed change ratio between the sheaves continuously and variably.

Usually, each of the primary and secondary sheaves is constructed of a fixed flange and a moving flange which form a V-shaped groove between them. The moving flanges move freely in the axial direction of the primary or secondary shaft. The groove width adjusting mechanism adjusts a speed change ratio continuously and variably by moving the moving flange.

Conventional V-belt type continuously variable transmissions of this type include a transmission in which the moving flange of the primary sheave is moved to adjust a groove width by an electric motor. Since the moving flange can be moved in both a direction to narrow the groove width of the primary sheave (top side) and a direction to widen the groove width (low side), the groove width can be freely adjusted (for example, refer to Japanese Patent No. 3043061).

In a scooter type two-wheeled motor vehicle provided with a mechanism for electronically controlling a V-belt type automatic continuously variable transmission, a speed change ratio is automatically changed on a program (map) previously inputted with respect to a vehicle speed and the number of revolutions of the engine (accelerator position) without requiring the operation of a rider. For this reason, the rider can easily operate the vehicle and application of the automatic continuously variable transmission to various kinds of vehicles has been tried.

While a two-wheeled motor vehicle provided with an automatic continuously variable transmission for performing this kind of electronic control has the merit of facilitating a driving operation, it cannot exert an engine brake effectively at the time of returning the accelerator and hence cannot take advantage of the engine brake effectively for driving. Moreover, a two-wheeled motor vehicle provided with an automatic continuously variable transmission cannot perform a kick down based on the intention of a rider such as is employed in AT vehicles such as automobiles, and hence is slow in acceleration when passing other vehicles or when running on climbing roads.

To solve these problems, an automatic continuously variable transmission provided with a deceleration lever for inputting the intention of a driver, wherein the speed change ratio is set manually according to the position of the deceleration lever (for example, refer to Japanese Patent No. 2950957); an automatic continuously variable transmission capable of changing a speed change ratio forcibly; and an automatic continuously variable transmission provided with a switch for shifting down manually (for example, refer to JP-A-62-175228) are known. These automatic continuously variable transmissions can produce an arbitrary speed change ratio optionally and continuously by the intention of a rider and make it possible to apply an engine brake to driving and to perform shifting down in advance, thereby resolving the problem of being slow in acceleration.

However, consideration is not given to forcibly and manually shifting down the continuously variable transmission by the intention of a rider, and then returning the mode ("kick down mode") to a normal mode. That is, while shifting down is performed as required based on the intention of the rider, the rider might desire shifting up following the shifting down to be automatically performed. In other words, if a straddle type vehicle capable of returning a kick down mode smoothly to a normal speed change mode can be developed, it would improve riding comfort.

SUMMARY OF THE INVENTION

The present invention has been made in view of these circumstances and provides a straddle type vehicle having a control unit that improves riding comfort and electronically controls the speed change of a continuously variable transmission. The control unit sets and releases a kick down mode of a temporary speed change ratio correction mode for assisting acceleration or deceleration according to driving conditions and a driver's intention.

A straddle type vehicle of the present invention includes a rider-operated accelerator operating part and a rider-operated kick down operating part that is separate from the accelerator operating part. A driving source has an output controlled according to operation of the accelerator operating part. A continuously variable transmission is connected to the driving source. A control unit electronically controls the continuously variable transmission. The control unit shifts to a kick down mode in which a speed change ratio is shifted to be lower than in a normal mode according to operation of the kick down operating part. The control unit also detects a state of the vehicle other than the kick down operating part and issues a kick down release command according to the detected state to release the kick down mode and return to the normal mode.

One preferred embodiment includes a throttle position sensor electrically connected to the control unit that detects a degree of opening of a throttle. The kick down release command is issued based on a throttle position signal outputted from the throttle position sensor.

In one preferred embodiment the kick down release command is issued based on the throttle position signal showing a closed state for a specified time after an open state for a specified time.

One preferred embodiment includes an accelerator position sensor electronically connected to the control unit that detects a state of the accelerator operating part. The kick down release command is issued based on an accelerator position signal outputted from the accelerator position sensor.

One preferred embodiment includes a vehicle speed sensor electronically connected to the control unit that detects a speed of the vehicle. The kick down release command is issued when the detected vehicle speed is a specified value or less.

One preferred embodiment includes a kick down release switch. The control unit issues a kick down release command according to input of the kick down release switch to release the kick down mode and return to the normal mode.

In one preferred embodiment, the kick down release switch is a kick down release button serving as a trigger for outputting the kick down release command. The kick down button is electrically connected to the control unit and the kick down release command is issued when the kick down release button is pressed.

The kick down release button is preferably positioned for operation by a thumb of the rider.

In one preferred embodiment, the control unit is electronically connected to a kick down button serving as the kick down operating part. The kick down operation is performed by pressing the kick down button.

In one embodiment, further pressing of the kick down button shifts to a kick down hold mode that holds the kick down mode for a specified time.

The control unit is preferably connected to an electric motor that moves a moving sheave of a primary sheave. A moving speed of the moving sheave is slower when returning to the normal mode than when shifting to the kick down mode.

In one preferred embodiment the straddle type vehicle is a two-wheeled motor vehicle, and the driving source is an engine. The continuously variable transmission is provided in a power transmission path between the engine and a driving wheel.

The present invention also provides a speed change control unit of a continuously variable transmission. The speed change control unit is provided in a power transmission path between an engine of a two-wheeled motor vehicle and a driving wheel. A normal mode speed change mechanism provides a normal mode that controls a speed change ratio according to a running condition of the vehicle. A kick down command input mechanism inputs a kick down command manually. A kick down mode speed change mechanism provides a kick down mode that shifts a speed change ratio to be lower than in the normal mode in response to an input of the kick down command. A release mechanism issues a kick down release command according to a specified operation or an establishment of a specified condition to release the kick down mode and return to the normal mode.

In one preferred embodiment, the kick down mode speed change mechanism shifts the speed change ratio to a target speed change ratio that is lower than the speed change ratio in the normal mode. The target speed change ratio achieved during the kick down mode is held.

In one preferred embodiment the kick down mode speed change mechanism changes the speed change ratio based on a correction value obtained by shifting a map command value used in the normal mode to be lower by a set value.

In one preferred embodiment the kick down command input mechanism is arranged on a rider's side and at a position to be operated by a thumb of the rider.

In one preferred embodiment the release mechanism is arranged on a rider's side and at a position to be operated by a thumb of the rider.

In one preferred embodiment the kick down command input mechanism and the release mechanism are provided by the same switch. The kick down command is issued when the switch is operated to a first position and the kick down release command is issued when the switch is operated to a second position.

In one preferred embodiment the kick down command input mechanism and the release mechanism are provided by the same switch. The kick down command and the kick down release command are alternately issued every time the switch is operated.

In one preferred embodiment the kick down command input mechanism and the release mechanism are separate switches. A higher priority is given to a command issued by a newer switch operation than to a command issued by an older switch operation.

In one preferred embodiment, when the kick down command input mechanism is operated and then a kick down command is inputted again, the kick down mode speed change mechanism further lowers the speed change ratio.

In one preferred embodiment, when an accelerator position satisfies a specified condition, the release mechanism issues the kick down release command.

In one preferred embodiment, when the number of revolutions of an engine satisfies a specified condition, the release mechanism issues the kick down release command.

In one preferred embodiment, when a specified time passes after a kick down command is inputted, the release mechanism issues the kick down release command.

In one preferred embodiment, when an acceleration of a vehicle satisfies a specified condition, the release mechanism issues the kick down release command.

In one preferred embodiment, when a braking operation is performed, the release mechanism issues the kick down release command.

In one preferred embodiment the release mechanism includes a determination mechanism that outputs a release command when a specified condition is satisfied. When at least two of an accelerator position, a number of revolutions of an engine, a braking operation, a period of time that passes after the kick down command is inputted, and an acceleration of a vehicle satisfy specified conditions, the determination mechanism issues the kick down release command.

In one preferred embodiment the release mechanism includes a rider-operated switch for outputting a kick down release command and a determination mechanism that outputs a release command when a specified condition is satisfied. When a kick down release command outputted from the switch is given as the specified condition or when at least two of an accelerator position, a number of revolutions of an engine, a braking operation, a period of time that passes after the kick down command is inputted, and an acceleration of a vehicle satisfy specified conditions, the determination mechanism issues the kick down release command.

According to the present invention, in a straddle type vehicle provided with a control unit for electronically controlling the speed change of a continuously variable transmission, the control unit performs a controlled shift to a kick down mode, and smoothly returns the kick down mode to a normal mode by issuing a kick down release command according to the state of the vehicle. Thus, the kick down mode is smoothly returned to the normal speed change mode. As a result, riding comfort is improved.

Moreover, according to the present invention, a speed change ratio is shifted to be lower than in the normal mode by the input of a kick down command. Hence, when a kick down command is inputted during acceleration, the normal mode is forcibly shifted to the kick down mode, whereby accelerating force is increased. Moreover, when a kick down command is inputted during deceleration, the speed change ratio is shifted to be lower and hence an engine brake effect is produced as in a manual transmission. Furthermore, since the kick down mode is released according to a release command and is returned to the normal mode, an appropriate kick down effect according to the intention of a driver is produced.

Alternatively, according to the present invention, when kick down is performed, a speed change ratio is forcibly shifted down to a specified speed change ratio shifted to be lower than in normal mode by a specified amount, and the specified speed change ratio is held. Thus, a reliable kick down effect is produced immediately. Moreover, according to the present invention, when a kick down mode is performed, a speed change ratio is shifted to be lower than a map command value used in the normal mode by a set amount. Thus, a kick down effect suitable for the running conditions is produced.

BRIEF DESCRIPTION OF THE DRAWINGS

FIG. 1 is a side view of a straddle type vehicle according to an embodiment of the present invention.

FIG. 2 is a block diagram of a control device (ECU) and its peripheral construction.

FIG. 3 is a diagram of a control method of the control device.

FIG. 4 is a side view of a two-wheeled motor vehicle according to an embodiment of the present invention.

FIG. 5 is a block diagram of a continuously variable transmission for a two-wheeled motor vehicle according to an embodiment of the present invention.

FIGS. 6A and 6B are diagrams of a kick down switch in a continuously variable transmission for a two-wheeled motor vehicle according to an embodiment of the present invention. FIG. 6A shows a state where the kick down switch is not yet pressed and FIG. 6B shows a state where the kick down switch is pressed.

FIG. 7 is a flow chart showing speed change control in a continuously variable transmission for a two-wheeled motor vehicle according to an embodiment of the present invention.

FIGS. 8A and 8B are characteristic graphs at the time of kick down in a continuously variable transmission for a two-wheeled motor vehicle according to an embodiment of the present invention. FIG. 8A is a characteristic diagram at the time of acceleration and FIG. 8B is a characteristic diagram at the time of deceleration.

FIG. 9 is a flow chart showing the flow of processing according to a modified embodiment of the present invention.

DETAILED DESCRIPTION OF THE INVENTION

Embodiments of the present invention are now described with reference to the drawings. In the following drawings, for the sake of simplifying description, parts denoted by the same reference symbols have substantially the same functions. The present invention is not limited to the following embodiments.

FIG. 1 is a side view of a straddle type vehicle 1 according to an embodiment of the present invention. FIG. 2 is a block diagram of a control device 120 mounted in vehicle 1 and its peripheral construction.

Vehicle 1 has a driving source (engine) 100 with its output controlled according to an accelerator operating part operated by a rider, a continuously variable transmission 11 connected to engine 100, and a control unit (ECU; electronic control unit) 120 for electronically controlling continuously variable transmission 11.

Vehicle 1 is a scooter type two-wheeled motor vehicle in which a driving force generated by engine 100 is transmitted to a rear wheel (driving wheel) 2 via continuously variable transmission 11. The accelerator operating part operated by the rider is an accelerator or an accelerator grip fixed to a handlebar.

Continuously variable transmission 11 includes a V-belt type automatic continuously variable transmission that is electronically controlled and in which a position of a moving sheave of a primary sheave is adjusted by a sheave position moving device (electric motor) 17. The primary sheave is coupled to a primary shaft 102 (crankshaft) rotated by engine 100.

Control unit 120 can shift to a kick down mode in which a speed change ratio is shifted to be lower than a speed change ratio in a normal mode by an operation of a rider on vehicle 1. In other words, control unit 120 shifts to kick down mode according to operation by a rider of a kick down operating part 25 mounted separately from the accelerator operating part.

In this embodiment, the kick down operating part is a kick down switch ("kick down SW") 25 electrically connected to control unit 120. The rider performs a kick down operation by turning on kick down switch 25. Kick down switch 25 may be, for example, a kick down button (KD button).

Control unit 120 can issue a kick down release command according to the state of vehicle 1, whereby kick down mode is released to return to a normal mode. The state of vehicle 1 is obtained by a sensor 27 electrically connected to control unit 120. Here, "the state of vehicle 1" means the state of a part other than kick down switch 25 and sensor 27 for obtaining the state of vehicle 1 such as, for example, a throttle position sensor (TPS) for detecting the throttle opening degree.

When sensor 27 is a throttle position sensor, a kick down release command is issued based on a throttle position signal outputted from the throttle position sensor. Alternatively, when sensor 27 is a vehicle speed sensor, a kick down release command is issued, for example, when the vehicle speed is a specified value or less.

Sensor 27 may also be an accelerator position sensor (APS) for detecting the state of the accelerator operating part. In this case, a kick down release command is issued based on an accelerator position signal outputted from the accelerator position sensor.

A control method of control unit 120 for switching between a normal mode (AT mode) and a kick down mode (KD mode, or multi-step KD mode) is now described with reference to FIG. 3.

First, when KD button 25 is pressed from any state 40, the rider can shift to kick down mode 50 (in this example, expressed in "multi-step KD mode"). When sensor 27 is a throttle position sensor (TPS), if a kick down release command is issued on the basis of a throttle position signal (route 51) showing a closed state of a specified time after an open state of a specified time, for example, when the continuously variable transmission is engaged in KD mode 50 during passing, AT mode (normal mode) 60 can be automatically returned to after passing (51). Here, the specified time has only to be set at an appropriate value.

In addition, for example, a continuously variable transmission in a state where KD mode 50 is engaged for traveling on slopes may be automatically returned to AT mode 60 by a throttle operation of close→open (route 52). Alternatively, if the specified time is constant, control unit 120 may be set such that KD mode 50 is automatically returned thereafter to AT mode 60 by an opening or closing throttle operation (route 53).

Moreover, when sensor 27 is a vehicle sensor, control unit 120 may be set such that if the speed of vehicle 1 is a specified value or less (route 62), the continuously variable transmission is automatically returned to AT mode 60. Here, the specified value can be set in the case where the vehicle speed becomes a certain number % or less or in the case where the vehicle speed becomes a certain number Km/h % or less.

In this regard, a method of returning the continuously variable transmission to AT mode 60 according to the rider's intention when a release button is pressed can also be adopted in combination with automatic return of the continuously variable transmission to AT mode 60 (route 64). That is, a kick down release switch or button can be provided as a kick down release operating part for issuing a kick down release command and returning the continuously variable transmission to normal mode 60. The kick down operating part (for example, kick down button 25) can double as the kick down release operating part. Control unit 120 can perform the following control: normal mode 60 is shifted to kick down mode 50 when button 25 is pressed once, and kick down mode 50 is returned to normal mode 60 when button 25 is pressed twice. Alternatively, a difference in function between a kick down operating part and a kick down release operating part can be effected by the way in which button 25 is pressed (for example, pressing button 25 for a long time or pressing button 25 two or more times consecutively). A kick down release operating part may also be separately provided from the kick down operating part.

To continue running in KD mode, the rider can shift to a KD hold mode 46, for example, by pressing the KD button for a long time. To return KD hold mode 46 to AT mode 60, control unit 120 may be set such that, for example, when a release button is pressed (route 64) or when a vehicle speed becomes a specified value or less (route 62), KD hold mode 46 is returned to AT mode 60.

According to the invention, control unit 120 can shift the continuously variable transmission to kick down mode 50 by a rider operation 42 and can issue a kick down release command according to the running state of vehicle 1 to return the continuously variable transmission to normal mode 60. Kick down mode 50 is thereby smoothly returned to normal speed change mode 60. In other words, since control unit 120 can automatically return the continuously variable transmission to normal speed change mode 60, riding comfort is improved.

Control unit 120 is preferably set such that electric motor 17 makes the moving speed of the moving sheave slower when the continuously variable transmission is returned to normal mode 60 than when the continuously variable transmission is shifted to kick down mode 50. The reason is as follows. The shift from normal mode 60 to kick down mode 50 is performed by an operation based on the rider's intention and hence the rider responds to the shifting naturally even if the moving speed is high. Conversely, the return to normal mode 60 is automatically performed and so making the moving speed slower enables the rider to respond to the return to normal mode as slowly as possible and improves riding comfort.

A speed change control device of a continuously variable transmission for a two-wheeled motor vehicle is now described with reference to FIGS. 4-6.

FIG. 4 is a side view of a two-wheeled motor vehicle 1 of this embodiment. A switch box 33 is fixed to the left grip of a handlebar 31 and kick down switch 25 is fixed to switch box 33. FIG. 5 shows a speed change control system of a V-belt type continuously variable transmission provided in a power transmission path of vehicle 1.

As shown in FIGS. 4 and 5, vehicle 1 is provided with V-belt type continuously variable transmission 11 as a transmission mechanism for transmitting power from engine 100.

V-belt type continuously variable transmission 11 includes a primary sheave 12 coupled to a primary shaft 102 (for example, a crankshaft) rotated by engine 100. A secondary sheave 13 is coupled to a secondary shaft 103 for outputting power to rear wheel 2 via a centrifugal clutch 15 and a speed reducing mechanism 16. A V-belt 14 is looped over primary sheave 12 and secondary sheave 13.

Primary sheave 12 and secondary sheave 13 have fixed sheaves 12A, 13A and moving sheaves 12B, 13B, respectively. A V groove in which V belt 14 is looped is formed between fixed sheave 12A and moving sheave 12B, and between fixed sheave 13A and moving sheave 13B. The driving force of engine 100 is converted to rotational force of V belt 14 by primary sheave 12, and the rotational force of V belt 14 is transmitted to rear wheel 2 via secondary sheave 13.

Moving sheave 12B of primary sheave 12 is electrically moved in an axial direction to adjust the width of the V groove to change the looping radius for the pulleys 12, 13 of V belt 14 and to continuously adjust a speed change ratio between pulleys 12, 13.

A sheave position moving device (mainly an electric motor) 17 adjusts the position of moving sheave 12B of primary sheave 12, and a sheave position detecting device 18 (corresponding to a mechanism for detecting an actual speed change ratio) detects the position of moving sheave 12B. Moving sheave 12B is moved by sheave moving device 17 based on the sheave position detected by sheave position detecting device 18 to change the looping radius of V belt 14 over primary sheave 12.

A secondary sheave number-of-revolutions sensor 19 for detecting the number of revolutions of secondary sheave 13 is provided upstream of centrifugal clutch 15, and a number-of-revolutions sensor 20 for detecting the number of revolutions of rear wheel 2 directly is provided downstream of centrifugal clutch 15 and near rear wheel 2, as detection devices for detecting the speed of vehicle 1. Sensors 19 and 20 detect a signal of a number of revolutions proportional to vehicle speed. A construction may be adopted in which only one of sensors 19 and 20 is provided.

A speed change ratio control unit (control unit) 120 controls the speed change ratio of continuously variable transmission 11 as a central element of a control system.

Control unit 120 has a microcomputer as a main element. A number-of-revolutions signal outputted from sensor 19 or sensor 20, a throttle position signal outputted from a throttle position sensor, a sheave position signal outputted from sheave position detecting device 18, and a main switch signal of a main switch 130 for turning on and off the electric power source of the whole of the vehicle, are inputted to control unit 120.

Control unit 120 controls the whole of engine 100 and continuously variable transmission 11 on the basis of these various signals described above. Specifically, control unit 120 computes a vehicle speed and an acceleration and then finds a target speed change ratio on the basis of the throttle position signal, the number of revolutions of the secondary sheave, the signal of the number of revolutions signal of the driving wheel, and the sheave position signal. Control unit 120 drives sheave position moving device 17 to realize the target speed change ratio to control the position of moving sheave 12B of primary sheave 12, that is, to perform so-called normal speed change control, whereby the actual speed change ratio of vehicle 1 is controlled.

Here, "normal speed change control" means control that computes a speed change ratio responding to running conditions (vehicle speed, throttle position and the like) from a previously registered map and provides a speed change command for realizing this speed change ratio to continuously variable transmission 11. The normal speed change control realizes smooth acceleration or deceleration by decreasing speed change ratio as vehicle speed and throttle position increase (controlling speed to a top side) or by increasing speed change ratio as vehicle speed and throttle position decrease (controlling speed to a low side).

Control unit 120 is supplied with electric power through an electric power supply line 112 from a vehicle-mounted electric power source 110. Power supply line 112 has a relay circuit 114 having a lock up function.

Relay circuit 114 has a relay switch 116 for controlling electric power supply to control unit 120 from power source 110 and a switch control element 117 for turning relay switch 116 on/off. When a main switch 130 is turned on, a switch starting voltage is applied to switch control element 117 via a first switch line 115.

When the switch starting voltage is applied to switch control element 117, switch control element 117 brings relay switch 116 to a closed state from an open state to close power supply line 112. With this, electric power is supplied to control unit 120 from power source 110 to bring control unit 120 into a drivable state. When control unit 120 is in the drivable state, sheave position moving device 17 is operated and speed change ratio control can be realized by controlling the position of moving sheave 12B.

A second switch line 118 supplies a switch starting voltage to switch control element 117 to keep relay switch 116 in a closed state until a specified condition is established even after main switch 130 is turned off.

Second switch line 118 is connected to a lock up circuit 121 provided in control unit 120. Lock up circuit 121 includes, for example, a capacitor, a diode and the like and applies voltage to switch control element 117 via second switch line 118, which is separate from first switch line 115.

A diode 119 in line 118 prevents current from flowing to lock up circuit 121 reversely and prevents excess current from flowing through lock up circuit 121 via second switch line 118 when switch 130 is turned on/off. Similarly, diode 113 In first switch line 115 prevents control unit 120 from making an erroneous determination that when main switch 130 is off, current is passed through control unit 120 from second switch line 118 to turn on a main switch signal.

When voltage supply is started from power source 110 via power supply line 112, lock up circuit 121 supplies voltage to switch control element 117 via second switch line 118. Thus, voltage is supplied to switch control element 117 from two lines: first switch line 115 via switch 130 and second switch line 118 via lock up circuit 121. When voltage is supplied to switch control element 117 from either first switch line 115 or second switch line 118, switch control element 117 switches relay switch 116 from an open state to a closed state and maintains relay switch 116 in such state until voltage is not supplied to switch control element 117 from either line 115 or 118. When voltage is not supplied by either line 115 or 118, relay switch 116 is switched to the open state from the closed state to interrupt electric power supply to control unit 120 via power supply line 112.

When the speed change ratio of continuously variable transmission 11 is not low or the vehicle speed is not zero when main switch 130 is turned off, lock up circuit 121 continues supplying voltage to switch control element 117 via second switch line 118.

Then, while switch control element 117 has voltage supplied thereto from second switch line 118 and control unit 120 has power supplied from power supply line 112, control unit 120 performs a normal speed change control based on vehicle speed and throttle position until the vehicle speed becomes zero even after main switch 130 is turned off. Then, when the vehicle speed is zero, control unit 120 outputs an electric power cutting command to lock up circuit 121. When the electric power cutting command is input to lock up circuit 121, lock up circuit 121 interrupts voltage supply to switch control element 117 via second switch line 118 to bring relay switch 116 to the open state from the closed state, whereby power supply to control unit 120 from power source 110 is interrupted.

Kick down switch 25, as shown in FIGS. 4 and 6, is mounted in switch box 33 of left grip 32 of handlebar 31 along with other kinds of switches. They are mounted on the rider's front and side to facilitate operation by the rider's left thumb. To facilitate switch operation by the rider's left thumb, it is desirable to arrange kick down switch 25 at a position of height lower than the center line of handlebar 31 or grip 32.

Kick down switch 25 functions as a kick down command input mechanism and as a kick down mode release mechanism. For example, when kick down switch 25 is pressed (a first position operation), a command that switches the continuous variable transmission to kick down mode is outputted to control unit 120, and when kick down switch 25 is released (a second position operation), a command for releasing the kick down mode and returning to normal mode (release command) is outputted to control unit 120.

In the following description, control of speed change ratio according to a previously registered map when kick down switch 25 is not operated is referred to as "normal mode" and this function corresponds to a normal mode speed change mechanism. In addition, in response to input of a kick down command, control unit 120 shifts a speed change ratio to be temporarily lower than a speed change ratio in normal mode. This mode is referred to as "kick down mode" and this function corresponds to a kick down mode speed change mechanism. That is, control unit 120 of this embodiment is a circuit realizing the normal mode speed change mechanism and the kick down mode speed change mechanism.

Next, speed change control flow of control unit 120 is described with reference to FIG. 7.

First, when a starter switch is operated by the rider and an engine starting signal is inputted to start the engine (step S101), control unit 120 produces a speed change command for controlling a speed change ratio in normal mode according to the map registered previously based on a vehicle speed signal outputted from sensor 22, a number of revolutions of the engine signal outputted from sensor 21, an accelerator position outputted from sensor 23, and an accelerator signal outputted from acceleration computing device 24, and outputs the speed change command to sheave position moving device 17. Sheave position moving device 17 moves moving sheave 12B according to this speed change command to perform speed change ratio control responsive to the map (step S102).

Next, in step S103, it is determined whether a kick down command is inputted by kick down switch 25. If a kick down command is not inputted, the routine returns to step S102 to continue speed change ratio control in normal mode.

When kick down switch 25 is pressed, the continuously variable transmission is shifted to kick down mode and the speed change ratio control in steps S104-S108 is performed.

In step S104, control unit 120 finds a target speed change ratio on the low side of the speed change ratio based on vehicle speed, the number of revolutions of the engine, and a current accelerator position, and computes the amount of movement of the sheave to achieve the target speed change ratio. This target speed change ratio may be a fixed ratio changed by a specified amount from the current speed change ratio, or may be a ratio changed gradually according to the vehicle speed, the number of revolutions of the engine, and the accelerator position at the respective moments. When the number of revolutions of the engine is larger than a revolution limit (upper limit of the number of revolutions of the engine) at the time of achieving the target speed change, a correction is made to the target speed change ratio to prevent the number of revolutions of the engine from exceeding the revolution limit. When the target speed change ratio is determined, if the current speed change ratio is not the target speed change ratio (step S105), moving sheave 12B is moved to a target position (step S106). If the current speed change ratio is the target speed change ratio, moving sheave 12B is held at the present position (step S107).

Next, control unit 120 checks whether a release command is inputted (step S108). If a release command is inputted, the routine returns to step S102 where kick down mode is shifted to normal mode to perform map control in normal mode again. If a release command is not inputted, the routine returns to step S104 where a target speed change ratio is computed according to vehicle speed, the number of revolutions of the engine, and the current accelerator position, and control in kick down mode continues.

As described above, in this embodiment, when kick down switch 25 is operated, the speed change ratio is forcibly shifted to be lower than in normal mode. Thus, when kick down switch 25 is operated during acceleration, a forcible kick down is performed to enhance accelerating force, whereas when kick down switch 25 is operated during deceleration, the speed change ratio is forcibly lowered to produce an engine brake effect as is produced in the case of an AT transmission.

Moreover, in this embodiment, kick down mode is returned to normal mode by a release command issued when kick down switch 25 is released, so an appropriate kick down effect responsive to the intention of the driver can be produced. For example, the driver can use kick down switch 25 in the following manner: when passing a vehicle running ahead, the driver presses kick down switch 25 to accelerate the vehicle in a kick down mode and moves his finger off kick down switch 25 after passing the target vehicle to return to normal mode. That is, the driver can switch the mode simply and clearly by operation of a single finger. Moreover, since kick down mode is set and released by the same kick down switch 25, the operation and device are simplified.

Moreover, if kick down switch 25 is constructed such that when kick down switch 25 is pressed (operated to the first position), kick down mode is set and such that when kick down switch 25 is released (operated to the second position), kick down mode is released, when passing a vehicle ahead, the driver can press kick down switch 25 to accelerate the vehicle in kick down mode and can move his finger off kick down switch 25 to return to normal mode after passing the target vehicle. Thus, the mode is readily and precisely switched with a single finger and easily reflects the intention of the driver.

Moreover, according to this embodiment, if kick down switch 25 is constructed such that when kick down switch 25 is pressed once, kick down mode is set, and such that when kick down switch 25 is pressed once more, kick down mode is released (in other words, kick down switch 25 is ON when the button is pressed once and OFF when pressed twice), when passing a vehicle ahead, the driver first presses kick down switch 25 to accelerate the vehicle in kick down mode, and when the target vehicle is passed, the driver presses kick down switch 25 once more to return to normal mode. In this case, the mode is readily and precisely switched with a single finger and easily reflects the intention of the driver. In addition, since kick down mode can be locked up (fixed to the low side of the speed change ratio) by pressing the button once, operability is improved particularly when acceleration is continued for a long time, such as when running on a mountain pass.

An embodiment has been shown where the speed change ratio is lowered during kick down mode. However, the speed change ratio may be changed during kick down mode based on a correction value obtained by shifting a map command value used in normal mode to a low side of the speed change ratio by a set amount. A kick down effect responsive to and appropriate for the running conditions can thereby be produced irrespective of the kick down mode being performed.

Moreover, a difference in the pattern of change of the speed change ratio may be caused between the time of acceleration and the time of deceleration in kick down mode.

FIGS. 8A and 8B show the relationship between speed change ratio and vehicle speed at the time of kick down mode. FIG. 8A shows speed change correction (correction of speed change ratio by kick down) performed at the time of acceleration, and FIG. 8B shows speed change correction (correction of speed change ratio by kick down) performed at the time of deceleration.

At the time of acceleration, as shown in FIG. 8A, the speed change ratio is preferably lowered by a specified amount and held there according to a kick down command. When acceleration is achieved and the kick down command is released, the continuously variable transmission is returned to normal mode. With this change, an acceleration response in kick down mode becomes the same as in a kick down operation in an AT vehicle and as in realizing acceleration by shift down in a manual transmission vehicle. Hence, the driver can operate the kick down switch 25 without feeling uncomfortable.

Moreover, at the time of deceleration, as shown by correction 2 in FIG. 8B, the speed change ratio is lowered by a specified amount and held according to the kick down command. The continuously variable transmission is returned to normal mode when deceleration is achieved and the kick down command is released. As shown by correction 1, it is also possible to shift a speed change ratio based on a correction value obtained by shifting a map command value (shown as a value without correction) used in normal mode by a set amount according to the kick down command, and to return to normal mode when deceleration is achieved and the kick down command is released.

A smaller shock is caused during deceleration at the time of speed change in the case of correction 1 than in the case of correction 2. Thus, whether correction 1 or correction 2 is used for changing speed change ratio is a factor in riding comfort. Thus, correction 1 or correction 2 should be set in consideration of the rider's idea for the vehicle.

In kick down during both acceleration and deceleration, shifting from the speed change ratio of normal mode to a lower speed change ratio (kick down speed change ratio), and shifting from the kick down speed change ratio to the speed change ratio of the normal mode may be performed quickly to some extent, but are preferably performed as continuously and gently as possible to avoid a speed change shock to the rider.

An embodiment has been shown in which when kick down switch 25 is pressed, a kick down command is issued, and in which when kick down switch 25 is released, a release command is issued. However, a speed change ratio control may be provided such that when kick down switch 25 is pressed once, a kick down command is issued, and that when kick down switch 25 is released, a release command is not issued, and that when kick down switch 5 is pressed once more, a release command is issued. That is, every time kick down switch 25 is pressed, a kick down command and a kick down release command may be alternately issued.

In this case, when passing a vehicle running ahead, the driver first presses kick down switch 25 to accelerate the vehicle at full acceleration in kick down mode; then, when the target vehicle is passed, the driver presses kick down switch 25 once more to return to normal mode. In this case, the mode is readily and precisely switched with a single finger, so the intention of the driver is easily reflected by a simple operation. In addition, when the driver presses the button once, kick down mode is locked up (speed change ratio is lowered). Thus, when continuing acceleration for a long time on a road with many curves, for example, when running on a mountain pass, the driver can hold kick down mode without concentrating on kick down switch 25. The drivability of vehicle 1 is thereby improved.

Moreover, a switch for issuing a kick down command and a switch for issuing a kick down release command may also be provided separately from each other, with a higher priority being given to a newer switch operation over an older switch operation. When passing a vehicle, the driver first presses the switch on a setting side to accelerate in kick down mode; then, when the target vehicle is passed, the driver operates the switch on a releasing side to return to normal mode.

In this manner, when kick down mode is set and released by separate switches, errors in mode switching operations can be reduced. When both switches are positioned for operation by a single finger, the mode can be readily and precisely switched with a single finger and hence can easily reflect the intention of the driver. Moreover, if separate kick down mode setting and release switches are provided, for example, a construction may be adopted in which the button switch is pressed in two steps, and the amount of kick down achieved by a first step can be increased by pressing a second step.
(Modification Relating to Kick Down Mode Release)

The means for issuing a release command is not limited to a kick down switch. Control unit 120 may be provided with a determination mechanism for issuing a release command when a specified condition is established to release kick down mode to return to normal mode. Hereinafter, examples are described.

As a first example, a release command may be issued when an accelerator position satisfies a specified condition. With this, kick down mode is automatically released according to accelerator position, so a special release operation is not necessary. Thus, the rider can concentrate on operating the accelerator after setting kick down mode.

Examples of release conditions in this case include:

(a) release when an accelerator position becomes smaller than a specified amount;
(b) release when an accelerator position returns to a position at the time of setting a kick down mode; and
(c) release when an accelerator position is within a specified range for a specified time.

For example, according to release condition (a), when passing a vehicle, the driver first sets kick down mode and starts accelerating the vehicle at a full-opened accelerator position, and can return to normal mode only by returning the accelerator when the vehicle is passed. Thus, the driver can run in reflection of the driver's intention at the moment when the driver wants to accelerate.

As a second example, a release command may be issued when the number of revolutions of the engine satisfies a specified condition. For example, when the number of revolutions of the engine becomes larger than a specified amount, the kick down mode can be automatically released. When the accelerator is fully opened in kick down mode to start acceleration and then the number of revolutions of the engine reaches a limit value, it is determined that further acceleration is impossible and kick down mode is returned to normal mode. Thus, useless running in kick down mode is reduced.

As a third example, a release command may be issued when a specified time passes after a kick down command is inputted. When a specified time passes after a kick down command is inputted, the continuously variable transmission is automatically returned to normal mode. Thus, for example, after kick down mode is set to exert an engine brake at the time of running on a down slope on a mountain pass, failure to return to normal mode due to forgetfulness of the driver is prevented.

As a fourth example, a release command may be issued when acceleration satisfies a specified condition. For example, when acceleration becomes lower than a specified amount, kick down mode may be automatically released and returned to normal mode according to the actual state of the vehicle reflecting the acceleration intention of the driver. Thus, a failure to return from kick down mode to normal mode brought about by a driver's forgetfulness or carelessness is prevented.

As a fifth example, a release command may be issued when a braking operation is performed. When a vehicle is accelerated by setting kick down mode, and a braking operation is performed thereafter, kick down mode is automatically released. Thus, kick down mode is released in reflection of the clear indication of intention of the driver.

Moreover, control unit 120 may issue a release command when at least two of the specified conditions of accelerator position, number of revolutions of the engine, elapse of time, acceleration of the vehicle, and the presence or absence of a braking operation, as described above, and operation of kick down switch 25 are satisfied.

Moreover, control unit 120 may issue a release command, not depending on operation of kick down switch 25, but when at least two of the specified conditions of accelerator position, number of revolutions of the engine, elapse of time, acceleration of the vehicle, and the presence or absence of a braking operation, are satisfied. In this case, even if two or more of the above-mentioned conditions are not satisfied, when kick down switch 25 is operated, a higher priority is given to a release command from kick down switch 25 and the continuously variable transmission is switched to normal mode.

In this manner, when control unit 120 issues a release command if at least two of the specified conditions of accelerator position, number of revolutions of the engine, elapse of time, acceleration of the vehicle, and the presence or absence of a braking operation are satisfied, the object of accelerating or decelerating vehicle 1 is achieved by making a detailed determination of the conditions of vehicle 1 in a comprehensive manner. Moreover, when there is a manual input for releasing by kick down switch 25, the intention of the rider is given effect by giving a higher priority to this manual input and releasing kick down mode.

(Modification of Kick Down Mode)

Control unit 120 may be modified, to enhance accelerating or decelerating force, to perform the kick down operation twice. For example, a switch on a kick down mode setting side may be provided independently of a switch on a releasing side and, the amount of kick down achieved by a first pressing may be increased by a second pressing.

Specifically, when kick down switch 25 is pressed once to shift from normal mode to kick down mode, and then is pressed again to input a kick down command to control unit 120, control unit 120 drives sheave moving device 17 to move moving sheave 12B of primary sheave 12 to lower a speed change ratio even further. That is, kick down is performed further during kick down mode to lower a speed change ratio even further.

Further kick down in kick down mode can be applied to a case where, for example, to exert an engine brake on a down slope such as a mountain pass, a rider shifts the continuously variable transmission to kick down mode, and then wants to exert a stronger engine brake because a corner is sharper than expected and hence an entry speed to the corner is higher than expected.

To change the speed change ratio at the time of the second kick down, the movement of moving sheave 12B may be equal to its movement at the time of the first kick down, or it may be smaller than its movement at the time of the first kick down.

Moreover, a kick down mode release after the second kick down may cause a return to the state at the time of the first kick down, in order to continue kick down mode, or it may cause a return to normal mode in one stroke. Here, as there are cases where the engine brake is not exerted suddenly or where transmission torque becomes small, it is preferable to return to normal mode in one stroke only when kick down switch 25 is operated by the rider.

FIG. 9 is a flow chart of the flow of processing in this modification. Hereinafter, the flow of processing in this modification is specifically described with reference to FIG. 9.

First, in normal mode, when kick down switch 25 is pressed, a kick down command is inputted to control unit 120 from kick down switch 25 and control unit 120 shifts the continuously variable transmission to kick down mode (step S111).

When in kick down mode, control unit 120 computes the amount of movement of the sheave to achieve a target speed change ratio lower than the present speed change ratio (step S112). At this time, it is determined previously by computation whether the number of revolutions of the engine when the target speed change ratio is achieved is larger than a revolution limit (upper limit of the number of revolutions of the engine) (step S113). If the number of revolutions of the engine is larger than the revolution limit, the routine proceeds to step S114 where the amount of movement of the sheave is corrected so as to change the target speed change ratio not to exceed the revolution limit, and then the routine proceeds to step S115. If the number of revolutions of the engine is not larger than the revolution limit, step S114 is skipped and the routine proceeds to step S115.

In step S115, control unit 120 makes sheave moving device 17 move moving sheave 12B based on the amount of sheave movement found in step S112 or step S114. With this, the looping radius of V belt 14 with respect to primary sheave 12 is changed, whereby the speed change ratio is lowered.

Thereafter, if it is determined in step S116 that kick down switch 25 is again operated by the rider, the routine returns to step S112 where a sheave position to lower the speed change ratio further is found, the sheave movement is computed, and steps S113-S115 are repeated.

Next, if a release command is inputted (step S117), the routine proceeds to step S118 where kick down mode is shifted to normal mode and map control in normal mode is performed again. If a release command is not inputted, control unit 120 continues control in kick down mode responding to the target speed change ratio.

As described above, when kick down switch 25 is operated in kick down mode to lower the speed change ratio, the speed change ratio is further lowered. Thus, when the rider feels that an accelerating or decelerating force is insufficient in kick down mode, the accelerating or decelerating force can be enhanced by one button operation. Therefore, when a high level of speed change operation is needed, for example, on a mountain pass, a speed change operation can be easily performed and smooth riding ensured.

Vehicle 1 shown in FIG. 1 is a scooter type two-wheeled motor vehicle, but the invention is not limited to this. If a two-wheeled motor vehicle is provided with a control unit for controlling the speed change of a continuously variable transmission electronically, the present invention can be applied to it. Here, "two-wheeled motor vehicle" means a motorcycle and includes a bicycle mounted with an engine (motorbike) and a scooter, specifically, a vehicle that can turn with a vehicle body inclined. Therefore, even if a vehicle has two wheels in at least one of the front or rear, and has three or four (or more) tires total, the vehicle is a "two-wheeled motor vehicle" as defined herein. Moreover, the present can be applied not only to two-wheeled motor vehicles but also to other straddle type vehicles including a four-wheeled buggy (ATV: All Terrain Vehicle) and a snowmobile. In the case of a four-wheeled buggy and the like, the accelerator operating part can be not only an accelerator grip type but also a lever type. In addition, while an internal combustion engine is used as driving source 100, a motor may also be used as driving source 100.

The present invention has been described with reference to preferred embodiments. However, the present invention is not limited to this description, and can be variously modified.

According to the present invention, a straddle type vehicle is provided with a control unit for improving riding comfort and for electronically controlling the speed change of a continuously variable transmission.

The invention claimed is:

1. A straddle type vehicle comprising:
a rider-operated accelerator operating part;
a rider-operated kick down operating part separate from the accelerator operating part;
a driving source with an output controlled according to operation of the accelerator operating part;
a continuously variable transmission connected to the driving source; and
a control unit electronically controlling the continuously variable transmission, wherein the control unit
shifts to a kick down mode in which a speed change ratio is shifted to be lower by a set amount than a speed change ratio at a time of occurrence of a kick down command in a normal mode according to operation of the kick down operating part, detects a state of the vehicle other than the kick down operating part, and issues a kick down release command according to the detected state to release the kick down mode and return to the normal mode.

2. The straddle type vehicle as claimed in claim 1, and further comprising:

a throttle; and a throttle position sensor electronically connected to the control unit, which detects a degree of opening of the throttle, wherein the kick down release command is issued based on a throttle position signal outputted from the throttle position sensor.

3. The straddle type vehicle as claimed in claim 2, wherein the kick down release command is issued based on the throttle position signal showing a closed state for a specified time after an open state for a specified time.

4. The straddle type vehicle as claimed in claim 1, and further comprising an accelerator position sensor electronically connected to the control unit, which detects a state of the accelerator operating part, wherein the kick down release command is issued based on an accelerator position signal outputted from the accelerator position sensor.

5. The straddle type vehicle as claimed in claim 1, and further comprising a vehicle speed sensor electronically connected to the control unit, which detects a speed of the vehicle, wherein the kick down release command is issued when the detected vehicle speed is a specified value or less.

6. The straddle type vehicle as claimed in claim 1, and further comprising a kick down release switch, wherein the control unit issues a kick down release command according to an input of the kick down release switch, and thereby releases the kick down mode and returns to the normal mode.

7. The straddle type vehicle as claimed in claim 6, wherein the kick down release switch is a kick down release button serving as a trigger for outputting the kick down release command, the kick down release button is electrically connected to the control unit, and the kick down release command is issued when the kick down release button is pressed.

8. The straddle type vehicle as claimed in claim 7, wherein the kick down release button is positioned for operation by a thumb of a rider.

9. The straddle type vehicle as claimed in claim 1, wherein the control unit is electronically connected to a kick down button serving as the kick down operating part, and the kick down operation is performed by the rider pressing the kick down button.

10. The straddle type vehicle as claimed in claim 9, wherein further pressing the kick down button shifts to a kick down hold mode that holds the kick down mode for a specified time.

11. The straddle type vehicle as claimed in claim 1, and further comprising an electric motor electronically connected to the control unit, wherein the continuously variable transmission includes a primary sheave having a moving sheave, the electric motor moves the moving sheave, and a moving speed of the moving sheave is slower when returning to the normal mode than when shifting to the kick down mode.

12. The straddle type vehicle as claimed in claim 1, wherein the straddle type vehicle is a two-wheeled motor vehicle, the driving source is an engine, and the continuously variable transmission is provided in a power transmission path between the engine and a driving wheel.

13. A speed change control unit of a continuously variable transmission provided in a power transmission path between an engine of a two-wheeled motor vehicle and a driving wheel comprising:

a normal mode speed change mechanism providing a normal mode that controls a speed change ratio according to a running condition of the vehicle;

a kick down command input mechanism inputting a kick down command manually;

a kick down mode speed change mechanism providing a kick down mode that shifts a speed change ratio to be lower by a set amount than a speed change ratio at a time of occurrence of a kick down command in the normal mode in response to an input of the kick down command; and a release mechanism issuing a kick down release command according to a specified operation or an establishment of a specified condition to release the kick down mode and return to the normal mode.

14. The speed change control unit of a continuously variable transmission as claimed in claim 13, wherein the kick down mode speed change mechanism shifts the speed change ratio to a target speed change ratio that is lower than the speed change ratio in the normal mode, when an execution of the kick down mode begins, and maintains the target speed change ratio that is achieved during the execution of the kick down mode.

15. The speed change control unit of a continuously variable transmission as claimed in claim 13, wherein during the execution of the kick down mode, the kick down mode speed change mechanism changes the speed change ratio based on a correction value obtained by shifting a map command value used in the normal mode to be lower by a set value.

16. The speed change control unit of a continuously variable transmission as claimed in claim 13, wherein the kick down command input mechanism is arranged on a rider's side and at a position to be operated by a thumb of the rider.

17. The speed change control unit of a continuously variable transmission as claimed in claim 13, wherein the release mechanism is arranged on a rider's side and at a position to be operated by a thumb of the rider.

18. The speed change control unit of a continuously variable transmission as claimed in claim 13, wherein the kick down command input mechanism and the release mechanism are provided by a same switch, and the kick down command is issued when the switch is operated to a first position and the kick down release command is issued when the switch is operated to a second position.

19. The speed change control unit of a continuously variable transmission as claimed in claim 13, wherein the kick down command input mechanism and the release mechanism are provided by a same switch, and the kick down command and the kick down release command are alternately issued each time the switch is operated.

20. The speed change control unit of a continuously variable transmission as claimed in claim 13, wherein the kick down command input mechanism and the release mechanism are separate switches, and a higher priority is given to a command issued by a newer switch operation than to a command issued by an older switch operation.

21. The speed change control unit of a continuously variable transmission as claimed in claim 13, wherein when a kick down command is inputted again after the kick down command input mechanism is operated, the kick down mode speed change mechanism further lowers the speed change ratio.

22. The speed change control unit of a continuously variable transmission as claimed in claim 13, wherein when an accelerator position satisfies a specified condition, the release mechanism issues the kick down release command.

23. The speed change control unit of a continuously variable transmission as claimed in claim 13, wherein when the number of revolutions of an engine satisfies a specified condition, the release mechanism issues the kick down release command.

24. The speed change control unit of a continuously variable transmission as claimed in claim 13, wherein when a specified time passes after a kick down command is inputted, the release mechanism issues the kick down release command.

25. The speed change control unit of a continuously variable transmission as claimed in claim 13, wherein when an acceleration of a vehicle satisfies a specified condition, the release mechanism issues the kick down release command.

26. The speed change control unit of a continuously variable transmission as claimed in claim 13, wherein when a braking operation is performed, the release mechanism issues the kick down release command.

27. The speed change control unit of a continuously variable transmission as claimed in claim 13, wherein
the release mechanism includes a determination mechanism outputting a
release command when a specified condition is satisfied, and
when at least two of an accelerator position, a number of revolutions of an engine, a braking operation, a period of time that passes after the kick down command is inputted, and an acceleration of a vehicle satisfy specified conditions, the determination mechanism issues the kick down release command.

28. The speed change control unit of a continuously variable transmission as claimed in claim 13, wherein the release mechanism includes
a rider-operated switch outputting a kick down release command, and
a determination mechanism outputting a release command when a specified condition is satisfied, and
when a kick down release command outputted from the switch is given as the specified condition or when at least two of an accelerator position, a number of revolutions of an engine, a braking operation, a period of time that passes after the kick down command is inputted, and an acceleration of a vehicle satisfy specified conditions, the determination mechanism issues the kick down release command.

* * * * *